(12) United States Patent
Tawa

(10) Patent No.: US 7,096,892 B2
(45) Date of Patent: Aug. 29, 2006

(54) FLUID FILLING DEVICE

(76) Inventor: Masaru Tawa, 662-8, Sakaedani, Wakayama-shi, Wakayama (JP) 640-8441

( * ) Notice: Subject to any disclaimer, the term of this patent is extended or adjusted under 35 U.S.C. 154(b) by 181 days.

(21) Appl. No.: 10/485,529

(22) PCT Filed: Aug. 7, 2002

(86) PCT No.: PCT/JP02/08092

§ 371 (c)(1),
(2), (4) Date: Feb. 2, 2004

(87) PCT Pub. No.: WO03/016195

PCT Pub. Date: Feb. 27, 2003

(65) Prior Publication Data

US 2004/0173285 A1  Sep. 9, 2004

(30) Foreign Application Priority Data

Aug. 9, 2001 (JP) ............................. 2001-242264

(51) Int. Cl.
   *B65B 1/04* (2006.01)
(52) U.S. Cl. .................. 141/35; 141/115; 141/126; 141/285; 137/571
(58) Field of Classification Search ................ 141/115, 141/120, 126, 230, 323, 331–345, 285, 297, 141/35; 137/123–127, 571
See application file for complete search history.

(56) References Cited

U.S. PATENT DOCUMENTS

| 1,705,312 | A | * | 3/1929 | Rovano ....................... 141/297 |
| 1,810,822 | A |   | 6/1931 | Erickson |
| 2,380,771 | A | * | 7/1945 | McDonald .................... 141/35 |
| 3,318,345 | A | * | 5/1967 | Beall, Jr. ..................... 141/59 |
| 4,007,764 | A | * | 2/1977 | Bandemor ................... 141/35 |
| 4,273,166 | A |   | 6/1981 | Bradley |
| 4,494,585 | A | * | 1/1985 | Waldecker .................... 141/98 |

* cited by examiner

*Primary Examiner*—Timothy L. Maust
(74) *Attorney, Agent, or Firm*—Wenderoth, Lind & Ponack, L.L.P.

(57) ABSTRACT

In the fluid filling device A of the present invention, when installed in the fluid filler port B1 of the drum B, the hollow internal space of the tubular body 10 provided with the communication part 10a communicating with the internal space of the drum B is divided into the fluid inlet part 10b for leading waste oil into the drum B from outside and the fluid outlet part 10c for leading the waste oil filled into the drum B to the outside of the drum B. The fluid filling device A is further provided with the fluid inlet 11 for leading the fluid from the fluid filler port outside the container in communication with the fluid inlet part 10b and the fluid outlet 12 for leading the fluid filled into the container to the outside of the container in communication with the fluid outlet part 10c.

10 Claims, 15 Drawing Sheets

FLUID FILLING DEVICE

TECHNICAL FIELD

The present invention relates to a fluid filling device used to fill fluid into a container, and more specifically, to a fluid filling device used to fill waste oil held in an oil tank of a heavy machine or the like into a drum.

BACKGROUND ART

Conventionally, in order to empty the waste oil out of an oil tank of a heavy machine or the like into a drum, the waste oil has been conveyed into a container from the outlet of the oil tank of the heavy machine, and the waste oil conveyed into the container has been pumped into a drum via a hose.

In this method, although it depends on the capacity of the oil tank and the capacity of the drum, the amount of the waste oil discharged from the heavy machine can be much larger than the capacity of the drum, which requires more than one drum to accommodate the waste oil.

In filling the waste oil into these drums, the waste oil is conveyed into a first drum, and when this drum is filled to capacity, the other end of the hose is switched to the fluid filler port of a second drum to fill the drum with the waste oil.

The hose switching operation is repeated until the oil tank is emptied.

However, the hose switching operation in emptying the waste oil into the drums is very troublesome, with the fear that the operator may inadvertently spill the waste oil from the drums.

The spilled waste oil may stain not only the drums as the containers but also the floor or the ground and the operator's clothing; cleaning the spilled waste oil is very troublesome.

The present invention, which has been contrived to solve these problems, has the object of providing a fluid filling device which can fill fluid into a container without difficulty or the fear of spilling the fluid, and consequently without the fear of staining the operator's clothing with the spilled fluid.

SUMMARY OF THE INVENTION

In order to achieve the object, the fluid filling device of the present invention can be installed in a fluid filler port of a container in a detachable manner to lead fluid from the outside of the container into the container in the state of being installed in the fluid filler port of the container. The fluid filling device is characterized by comprising a fluid inlet part for leading the fluid outside the container into the container, and a fluid outlet part for leading the fluid filled into the container to the outside of the container when the container is filled to capacity with the fluid led into the container through the fluid inlet part.

In other words, when the fluid filling device is installed in the fluid filler port of the container, the fluid outside the container is led into the container via the fluid inlet part. When the container is filled to capacity with the fluid, the fluid in the container is led to the outside of the container via the fluid outlet part.

The fluid filling device can be installed in a fluid filler port of a container in a detachable manner to lead fluid discharged from another fluid filler port outside the container into the container by being connected to the other fluid filler port outside the container in the state of being installed in the fluid filler port of the container. The fluid filling device is characterized in that the hollow internal space of the tubular body provided with the communication part communicating with the internal space of the container in the state of being installed in the fluid filler port of the container is divided into the fluid inlet part for leading fluid into the container from the outside in communication with the communication part and the fluid outlet part for leading the fluid filled into the container in communication with the communication part to the outside of the container. The fluid filling device is also characterized by comprising a fluid inlet for leading the fluid from the fluid filler port outside the container in communication with the fluid inlet part, and the filler outlet for leading the fluid filled into the container to the outside of the container in communication with the fluid outlet part.

In other words, a fluid inlet path is formed of the communication part communicating with the internal space of the container, the fluid inlet part formed in the internal space of the tubular body in communication with the communication part, and the fluid inlet communicating with the fluid inlet part, whereas a fluid outlet path is formed of the communication part communicating with the internal space of the container, the fluid outlet part formed in the internal space of the tubular body in communication with the communication part, and the fluid outlet communicating with the fluid outlet part.

The fluid filling device is further characterized by shaping the inlet like a funnel.

Thus, the fluid inlet path is formed of the communication part communicating with the internal space of the container, the fluid inlet part formed in the internal space of the tubular body in communication with the communication part, and the funnel-shaped fluid inlet communicating with the fluid inlet part.

DETAILED DESCRIPTION OF THE INVENTION

An embodiment of the fluid filling device of the present invention will be described as follows with reference to FIG. 1 to FIG. 5.

Figure 1:
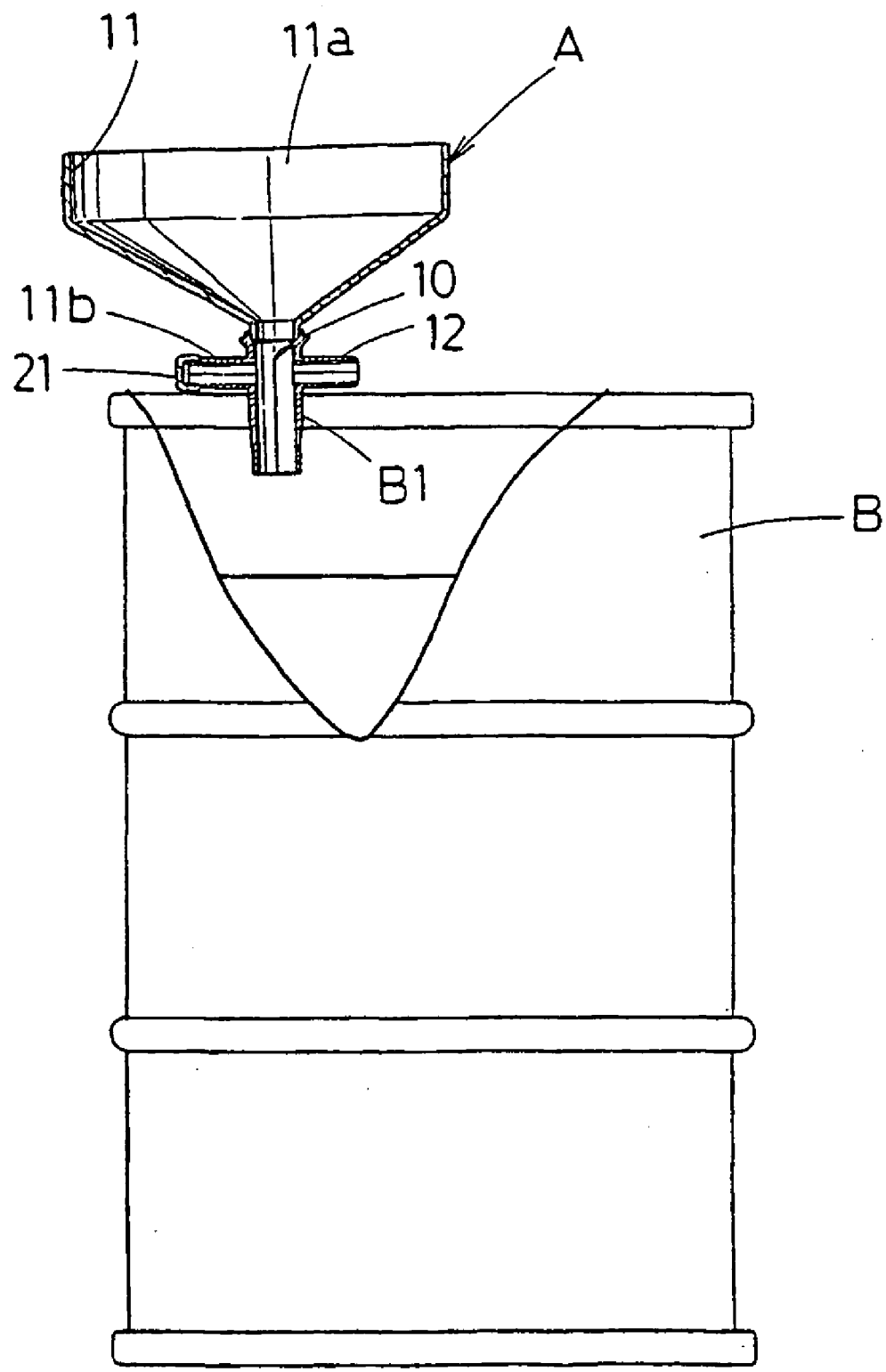
FIG. 1 is a view of the fluid filling device of the present invention in use.

FIG. 1 is a view of the fluid filling device of the present invention in use that is installed in the fluid filler port of a container for which a drum is used in the present embodiment.

The following description takes up the case of filling waste oil held in an oil tank of a heavy machine into a drum.

As shown in FIG. 1, the fluid filling device A of the present invention is used in the state of being installed in the fluid filler port B1 of the drum B as the container.

Figure 2:
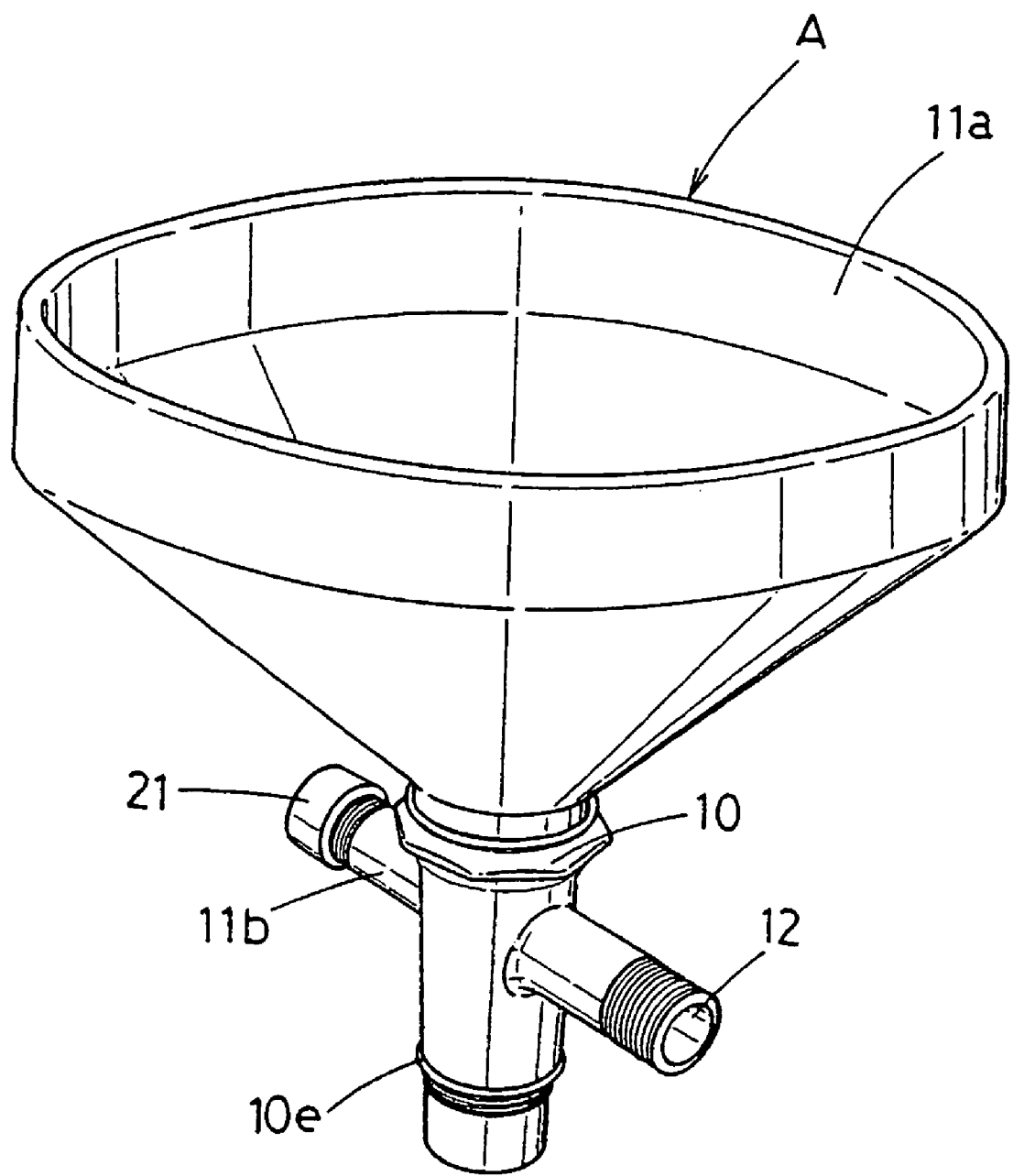
FIG. 2 is an external appearance of the fluid filling device of the present invention.
Figure 3:
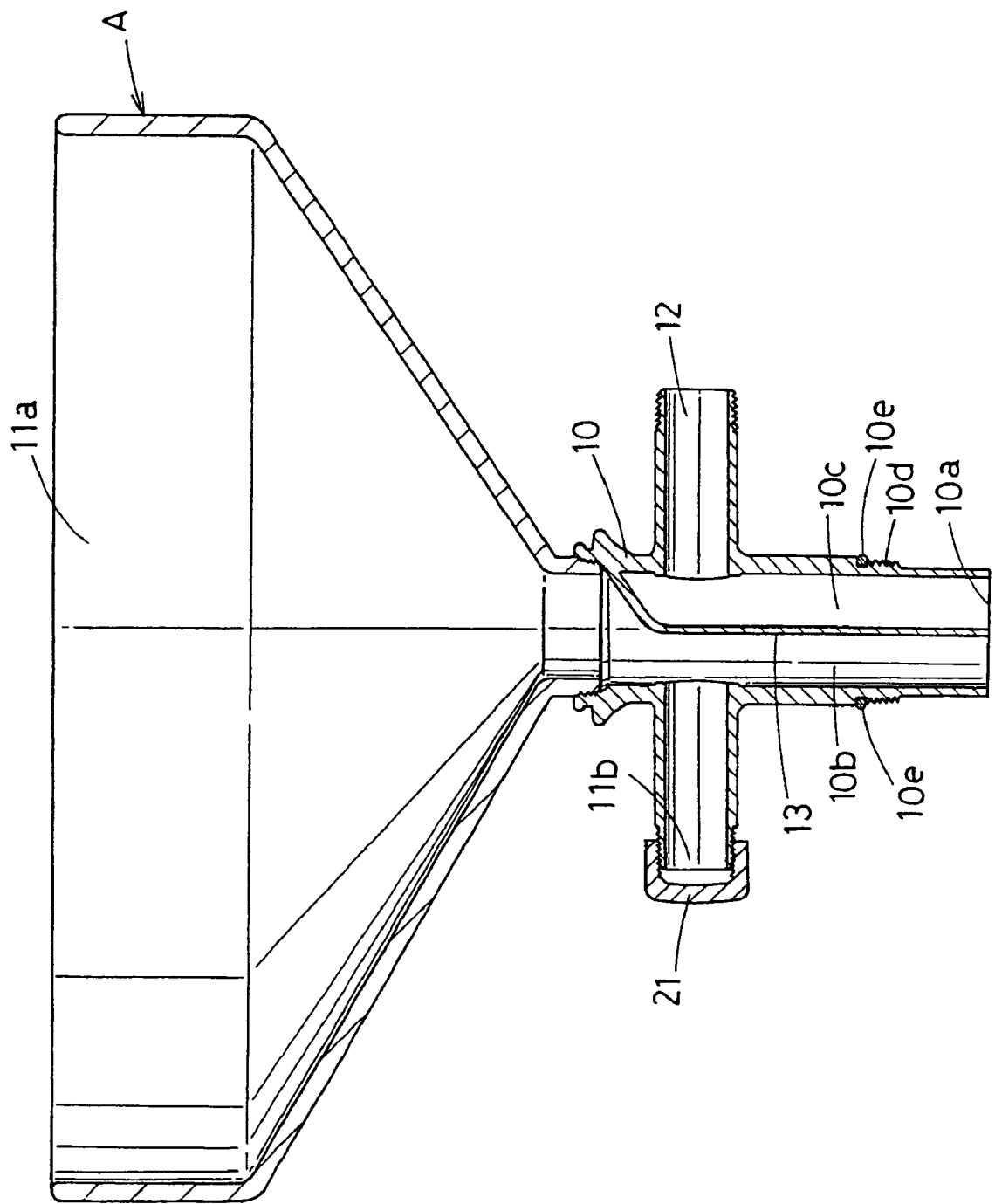
FIG. 3 is a cross sectional view of the fluid filling device of the present invention.

FIG. 2 and FIG. 3 show an external appearance and a cross section, respectively, of the fluid filling device A.

As shown in FIG. 3 the fluid filling device A of the present invention is composed of: the tubular body 10 including the communication part 10a communicating with the internal space of the drum B in the state of being installed in the fluid filler port B1 of the drum B, the hollow internal space of the tubular body 10 being divided into the fluid inlet part 10b for leading waste oil from the outside into the drum B and the fluid outlet part 10c for leading the waste oil filled into the drum B to the outside of the drum B; the fluid inlet 11 for leading fluid from a fluid filler port at the outside of the container into the fluid inlet part 10b; and the fluid outlet 12 for leading the fluid filled into the container to the outside of the container and which is in communication with the fluid outlet part 10c.

The tubular body 10 in the present embodiment is made from steel and shaped like a cylinder having an open top and an open bottom, and when installed in the fluid filler port B1 of the drum B, the open bottom end communicates with the hollow internal space of the drum B.

On the outer wall in the vicinity of the open bottom end of the tubular body 10 has a screw groove 10d which is screwed into the screw thread formed on the inner wall of the fluid filler port B1 of the drum B. When the screw groove 10d is screwed into the screw thread of the fluid filler port B1 of the drum B, the open end of the tubular body 10 is pressed inside the drum B, so that these two spaces (i.e., inside and outside of the drum B) can communicate with each other.

In the present embodiment, the open end on the bottom side corresponds to the communication part 10a.

In addition, a packing 10e is provided on the top end part of the screw groove 10d and on the outer wall of the tubular body 10. When the screw groove 10d is screwed into the screw thread of the fluid filler port B1 of the drum B, the packing 10e comes into contact with the top end of the fluid filler port B1 to make the connection between the fluid filler port B1 and the tubular body 10 airtight.

The hollow internal space of the tubular body 10 thus structured is divided into the fluid inlet part 10b for leading waste oil from the outside into the drum B, and the fluid outlet part 10c for leading the waste oil filled into the drum B to the outside of the drum B. In the present embodiment, this internal space is divided by the divider wall 13 into the fluid inlet part 10b and the fluid outlet part 10c.

The divider wall 13 is formed into a nearly rectangular plate having a predetermined thickness, with a width nearly the same size as the diameter of the tubular body 10 shaped like a cylinder and a length nearly the same size as the height of the tubular body 10.

The divider wall 13 thus formed is arranged in such a manner that the hollow internal space is divided into two parts nearly equal from the top end of the tubular body 10 to the communication part 10a which has the bottom end of the tubular body 10.

In this case, the divider wall 13, which is designed to have a width and a length nearly the same as the diameter and height of the tubular body 10, respectively, divides the hollow internal space into the fluid inlet part 10b and the fluid outlet part 10c independent of each other.

The fluid inlet part 10b is provided to lead fluid into the drum B, and is one of two internal spaces of the tubular body 10 formed by the divider wall 13.

In the present embodiment, the fluid inlet part 10b communicates with the aforementioned communication part 10a because the divider wall 13 divides the internal space from the top surface of the tubular body 10 to the communication part 10a.

The fluid outlet part 10c is provided to lead the fluid to the outside of the drum B when the drum B is filled to capacity with the fluid, and is the other of the internal spaces of the tubular body 10 formed by the divider wall 13. This fluid outlet part 10c, like the fluid inlet part 10b, communicates with the communication part 10a of the tubular body 10.

The fluid inlet part 10b of the tubular body 10 thus structured communicates with the fluid inlet 11 which is provided to lead fluid into a fluid filler port at the outside of a container.

This fluid inlet 11 is provided to lead fluid into a fluid filler port at the outside of the drum B. In the present embodiment, the fluid inlet 11 is composed of the funnel-shaped funnel member 11a which is installed on the top side of the tubular body 10 in a detachable manner and of the nearly cylindrical fluid inlet member 11b projecting from the outer wall of the tubular body 10.

This funnel member 11a is shaped like a funnel with a top side which is larger in diameter than the bottom side. The nozzle has a smaller diameter and is designed to have nearly the same diameter as the open end of the top end of the tubular body 10 and is also provided with a screw groove to be screwed into the screw thread formed on the inner wall of the open top end of the tubular body 10.

Thus, this funnel member 11a can be installed in the tubular body 10 in a detachable manner by screwing its nozzle into the top side of the tubular body 10.

Figure 4:
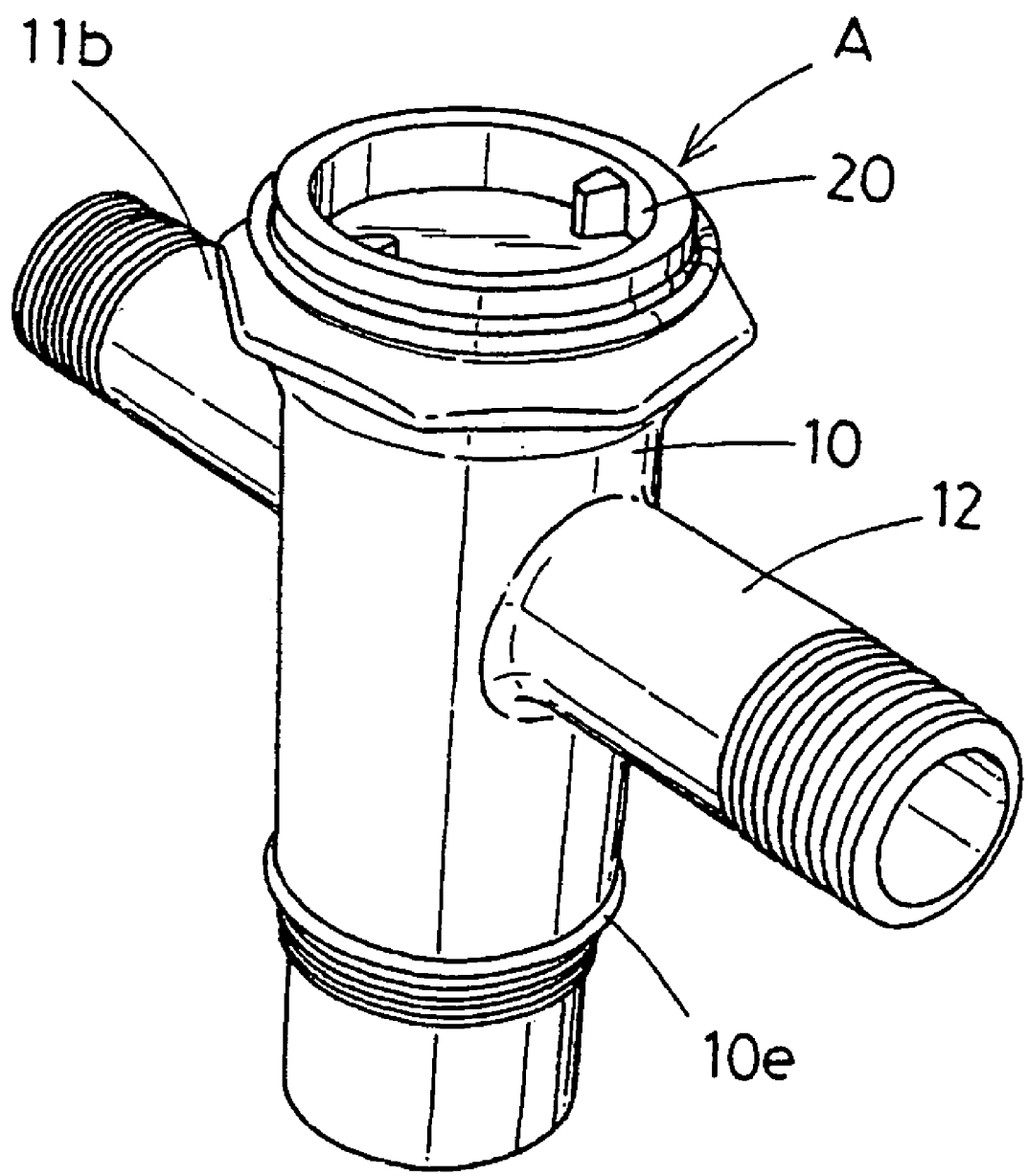
FIG. 4 is a view of the fluid filling device of the present invention in another use.

When this funnel member 11a is not installed in the open end of the top side of the tubular body 10, as shown in FIG. 4, the lid 20 can be attached in place of the funnel member 11a.

In this case, the fluid inlet member 11b becomes the fluid inlet 11. The fluid inlet member 11b is shaped like a cylinder hollow inside, one end thereof communicating with the fluid inlet part 10b or one of the internal spaces of the tubular body 10 and projecting from the outer wall of the tubular body 10. The connection part between the fluid inlet member 11b and the tubular body 10 faces the surface of the divider wall 13.

The fluid inlet member 11b is covered with the lid 21 at its tip when the funnel member 11a is used as the fluid inlet 11.

More specifically, when the funnel member 11a is used as the fluid inlet 11, the lid 21 is attached to the fluid inlet member 11b to make the funnel member 11a exclusively communicate with the fluid inlet part 10b. On the other hand, when the fluid inlet member 11b is used as the fluid inlet 11, the funnel member 11a is removed from the tubular body 10 and the lid 20 is attached to the open end of the tubular body 10 to make the fluid inlet member 11a exclusively communicate with the fluid inlet part 10b.

The nozzle of the funnel member 11a thus structured is designed to communicate with the fluid inlet part 10b of the tubular body 10 when installed on the top side of the tubular body 10.

The divider wall 13, as shown in FIG. 3, is bent around the tip end portion on the top side of the tubular body 10 to be joined with the edge of the open end of the tubular body 10.

More specifically, the funnel member 11a (or fluid inlet member 11b), the fluid inlet part 10b, and the communication part 10a communicate with each other so as to form a fluid inlet path for leading fluid into the drum B from the outside of the drum B when the fluid filling device A is installed on the drum B.

In addition, on the outer wall of the tubular body 10 is provided the fluid outlet 12 shaped like a cylinder in such a manner as to face the surface of the divider wall 13 arranged in the internal space of the tubular body 10.

The fluid outlet 12 leads the fluid filled into the drum B to the outside of the drum B and communicates with the fluid outlet part 10c.

More specifically, the fluid outlet 12, the fluid outlet part 10c, and the communication part 10a communicate with each other so as to form a fluid outlet path for leading the fluid filled into the drum B to the outside of the drum B when the fluid filling device A is installed in the drum B.

Next, filling waste oil from the oil tank of the heavy machine into the drum B using the fluid filling device A thus structured will be described with reference to FIG. 5.

The following description applies to the case in which three fluid filling devices A1 to A3 structured as above are installed in the fluid filler ports B1 to D1 of the drums B to D, respectively, to fill the waste oil held in the oil tank of the heavy machine (not illustrated) into the drums.

Of the fluid filling devices A1 to A3, only the fluid filling device A1 to be installed in the drum B uses the funnel member 11a as the fluid inlet 11 shown in FIG. 2, and the other fluid filling devices A2 and A3 use the fluid inlet member 11b as the fluid inlet 11 shown in FIG. 4 in place of the funnel member 11a.

Figure 5:
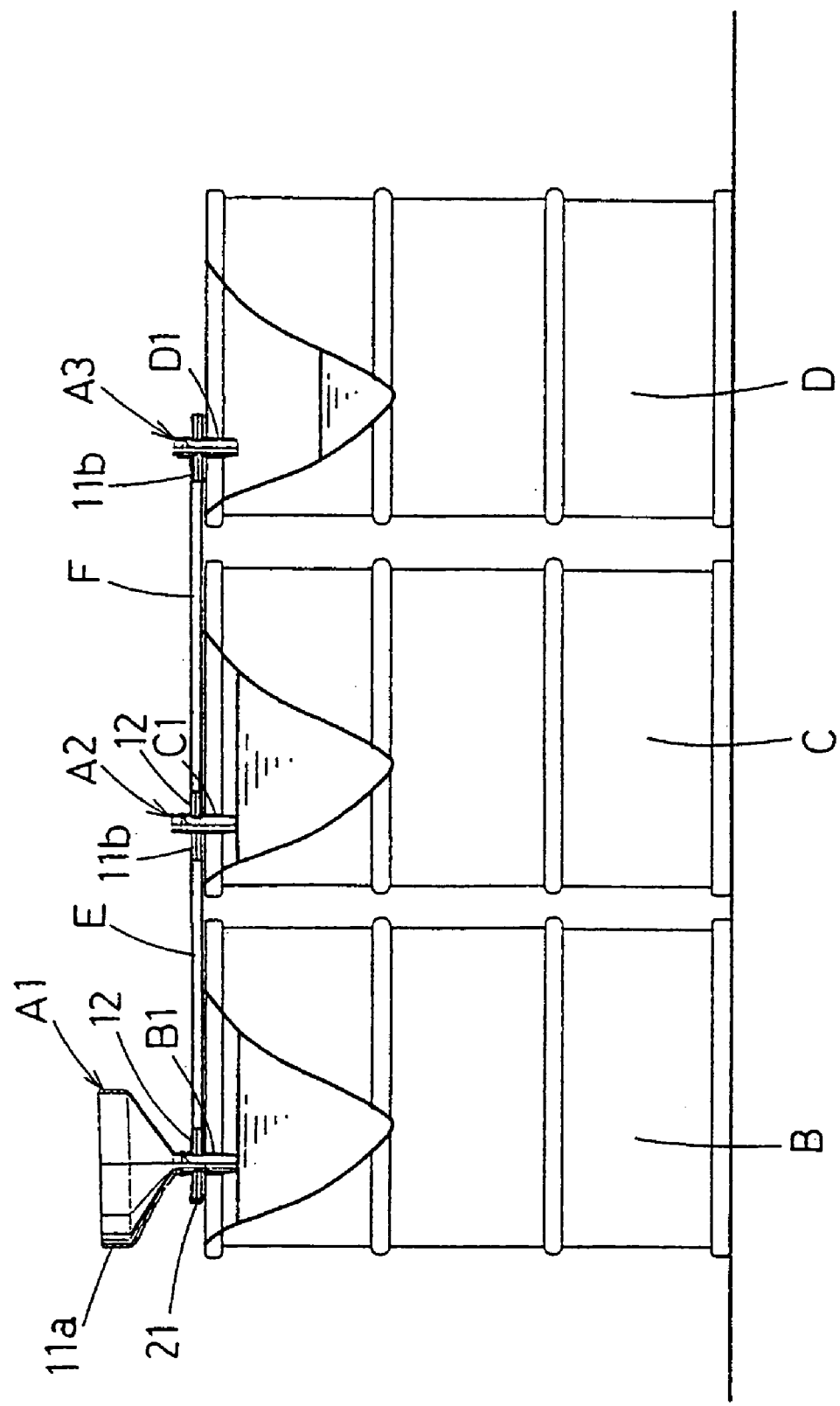
FIG. 5 is a view of the fluid filling device of the present invention in use.

First, as shown in FIG. 5, the fluid outlet 12 of the fluid filling device A1 installed in the fluid filler port B1 of the drum B is connected to the fluid inlet member 11b of the fluid filling device A2 installed in the fluid filler port C1 of the drum C via the hose E.

In the same manner, the fluid outlet 12 of the fluid filling device A2 is connected to the fluid inlet member 11b of the fluid filling device A3 installed in the fluid filler port D1 of the drum D via the hose F.

The following is a description of the filling of the waste oil held in the oil tank into the drums B to D connected to each other via the hoses E and F and the fluid filling devices A1 to A3.

It must be noted that in the present embodiment, waste oil is manually filled into a drum B from an oil tank of a heavy machine (not illustrated).

First, the operator pours waste oil from a container (not illustrated) filled with the waste oil discharged through the outlet of an oil tank for a heavy machine into the fluid filling device A1 through the funnel member 11a. The waste oil is poured through the funnel member 11a into the container or the drum B via the fluid inlet path formed of the fluid inlet part 10b and the communication part 10a of the tubular body 10. In this case, the funnel shape of the funnel member 11a can easily and swiftly lead the waste oil into the drum B.

Since the fluid inlet member 11b as the other fluid inlet 11 is covered with the lid 21, the waste oil is not led from the fluid inlet member 11b.

Next, the waste oil is led and filled into the drum B. When the liquid level reaches the communication part 10a of the tubular body 10, the waste oil flows through the communication part 10a of the tubular body 10 and then the fluid outlet part 10c so as to be led outside through the fluid outlet 12 communicating with the fluid outlet part 10c.

In this case, the connection between the drum B and the tubular body 10 of the fluid filling device A installed in the fluid filler port B1 of the drum B is kept airtight by the packing 10e, so that when the liquid level of the waste oil filled into the drum B reaches the communication part 10a of the tubular body 10, the waste oil is led outside through the fluid outlet part 10c and the fluid outlet 12.

As described above, when the drum B is filled with the waste oil and the waste oil is led from the fluid outlet 12 of the fluid filling device A1, the waste oil is led into the drum C by way of the fluid inlet path formed of the fluid inlet member 11b, the fluid inlet part 10b, and the communication part 10a of the fluid filling device A2 via the hose E.

At this moment, in the fluid filling device A2, since the fluid inlet member 11b is used as the fluid inlet 11 and the top side of the tubular body 10 is covered with the lid 20, the waste oil is led into the drum C via the fluid inlet member 11b.

When the drum C is filled with the waste oil and the liquid level of the waste oil reaches the communication part 10a of the fluid filling device A2, the waste oil is this time led outside the drum C via the fluid outlet path formed of the communication part 10a, the fluid outlet part 10c and the fluid outlet 12 of the fluid filling device A2.

In the drum D, the waste oil is filled in the same manner as described above and the same operations are repeated until the oil tank is emptied.

In the present embodiment, the filling of the waste oil is completed before the drum D is filled to capacity, with the oil tank empty.

As described hereinbefore, when the fluid filling device of the present invention is installed in the fluid filler port of the container, the fluid inlet path for leading fluid from outside is formed of the fluid inlet, the fluid inlet part and the communication part so as to lead the fluid into the container. When the container is filled, the fluid is led to the outside of the container via the fluid outlet path formed of the fluid outlet, the fluid outlet part, and the communication part.

This brings about the effect of filling the fluid into the containers sequentially without difficulty and eliminating the fear of spilling the fluid from the containers only by installing this fluid filling device in the fluid filler port of the container. In addition, this eliminates the fear of staining the operator's clothing.

Although one of the embodiments of the fluid filling device of the present invention has been described in detail, the fluid filling device of the present invention can be variously modified. The aforementioned embodiment describes the case in which the waste oil is manually filled into the drums. However, it is a matter of course to say that the oil discharged from the oil tank can be automatically pumped into the drums.

In this case, one end of the hose is put inside the container (not illustrated) filled with the waste oil emptied out of the oil tank of the heavy machine, and the other end is connected to the fluid inlet member 11b of the fluid filling device A1.

More specifically, the fluid filling device A1 does not use the funnel member 11a, and the upper side of the tubular body 10 on which the funnel member 11a used to be installed is covered with the lid 20, and the fluid inlet member 11b is used as the fluid inlet 11. As a result, the waste oil is led into the drum B via the fluid inlet member 11b.

In the same manner as in the aforementioned embodiment, the fluid filling devices A2 and A3 are connected to the fluid filling device A1 via the hoses.

Such a structure using a pump can provide the same effects as the above embodiment.

In the above embodiment, the communication part has an open end. However, it is also possible to provide a communication hole in place of this open end.

In addition, the divider wall can be of any shape and size as long as it divides the internal space of the tubular body into the fluid inlet part and the fluid outlet part to form the inlet path and the outlet path of the fluid. And the divider wall can be placed in any position inside the tubular body.

Figure 6:
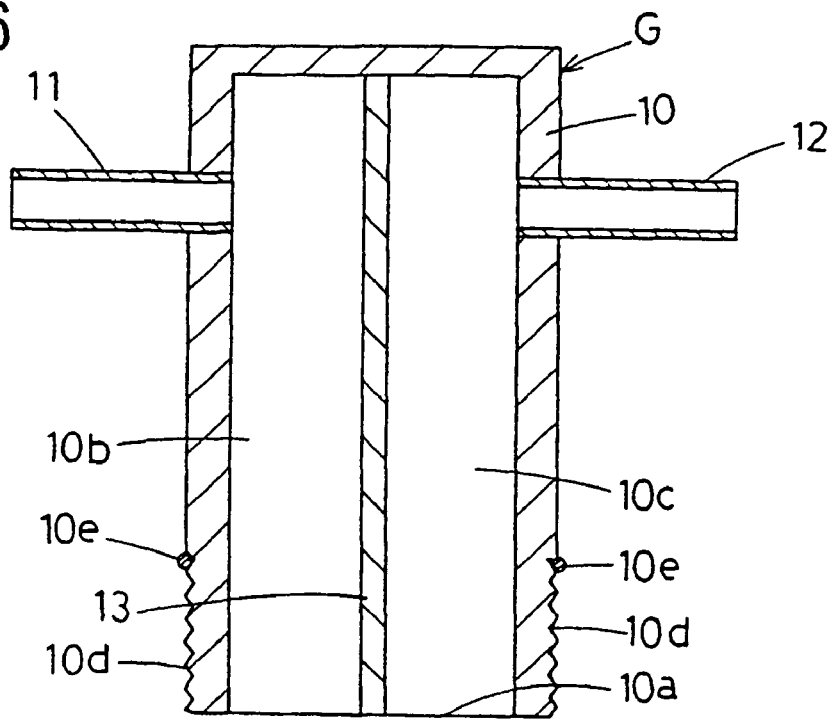
FIG. 6 is a cross sectional view of another embodiment of the fluid filling device of the present invention.
Figure 7:
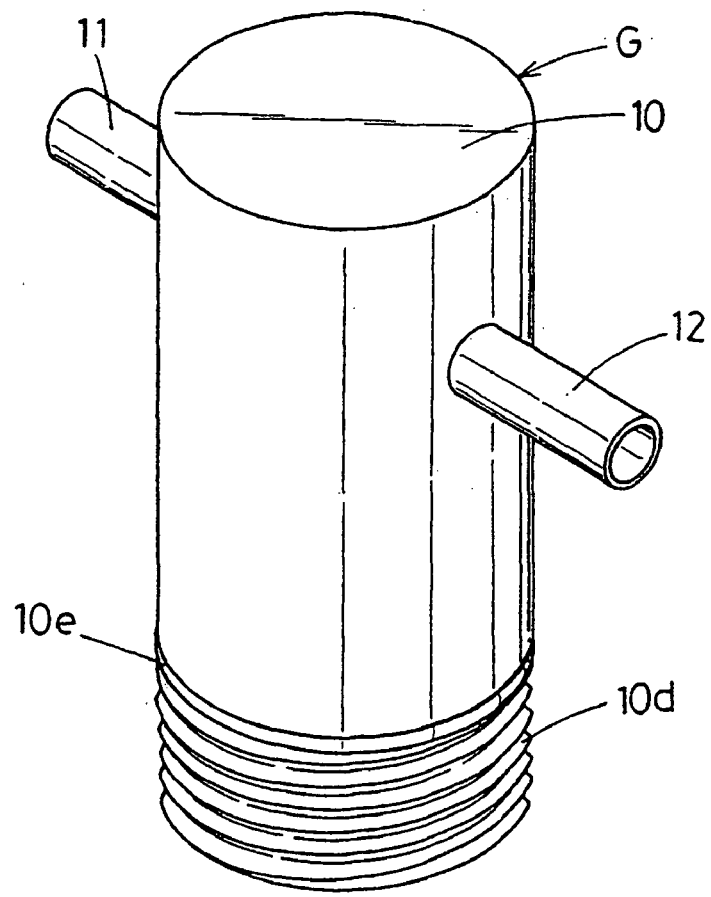
FIG. 7 is an external appearance of the embodiment of the fluid filling device of the present invention.

It is also possible to form the fluid filling device of the present invention as shown in FIG. 6 and FIG. 7. This fluid filling device will be described as follows. In the following description, the same components as those in the above embodiment are referred to with the same reference symbols.

In the fluid filling device G of the present embodiment, the tubular body 10 is shaped like a cylinder with a bottom surface and is provided with the divider wall 13 in its hollow internal space. Therefore, the internal space is divided into the fluid inlet part 10b and the fluid outlet part 10c.

In this case, the fluid inlet 11 shaped liked a cylinder is provided on the outer wall of the tubular body 10 with the bottom surface, and faces the wall surface of the divider wall 13 placed in the internal space of the tubular body 10 with the bottom surface.

The fluid inlet 11 which is provided to lead the fluid from a fluid filler port outside the drum B communicates with the fluid inlet part 10b. More specifically, the fluid inlet 11, the fluid inlet part 10b, and the communication part 10a communicate with each other so as to form an inlet path for leading fluid into the drum B from the outside of the drum B, with the fluid filling device G installed in the drum B.

A cylinder-shaped fluid outlet 12 is provided on the other part that faces the wall surface of the divider wall 13 provided in the internal space of the tubular body 10 with the bottom surface, and is on the outer wall of the tubular body 10.

The fluid outlet 12, which is provided to lead the fluid filled into the drum B to the outside of the drum B, communicates with the fluid outlet part 10c. More specifically, the fluid outlet 12, the fluid outlet part 10c, and the communication part 10a communicate with each other to form an outlet path for leading the fluid filled into the drum B to the outside of the drum B, with the fluid filling device G installed in the drum B.

According to the above structure, similar to the aforementioned embodiment, fluid can be led into the container via the fluid inlet path. When the container is filled with fluid, the fluid can be led outside via the fluid outlet path.

Figure 8:
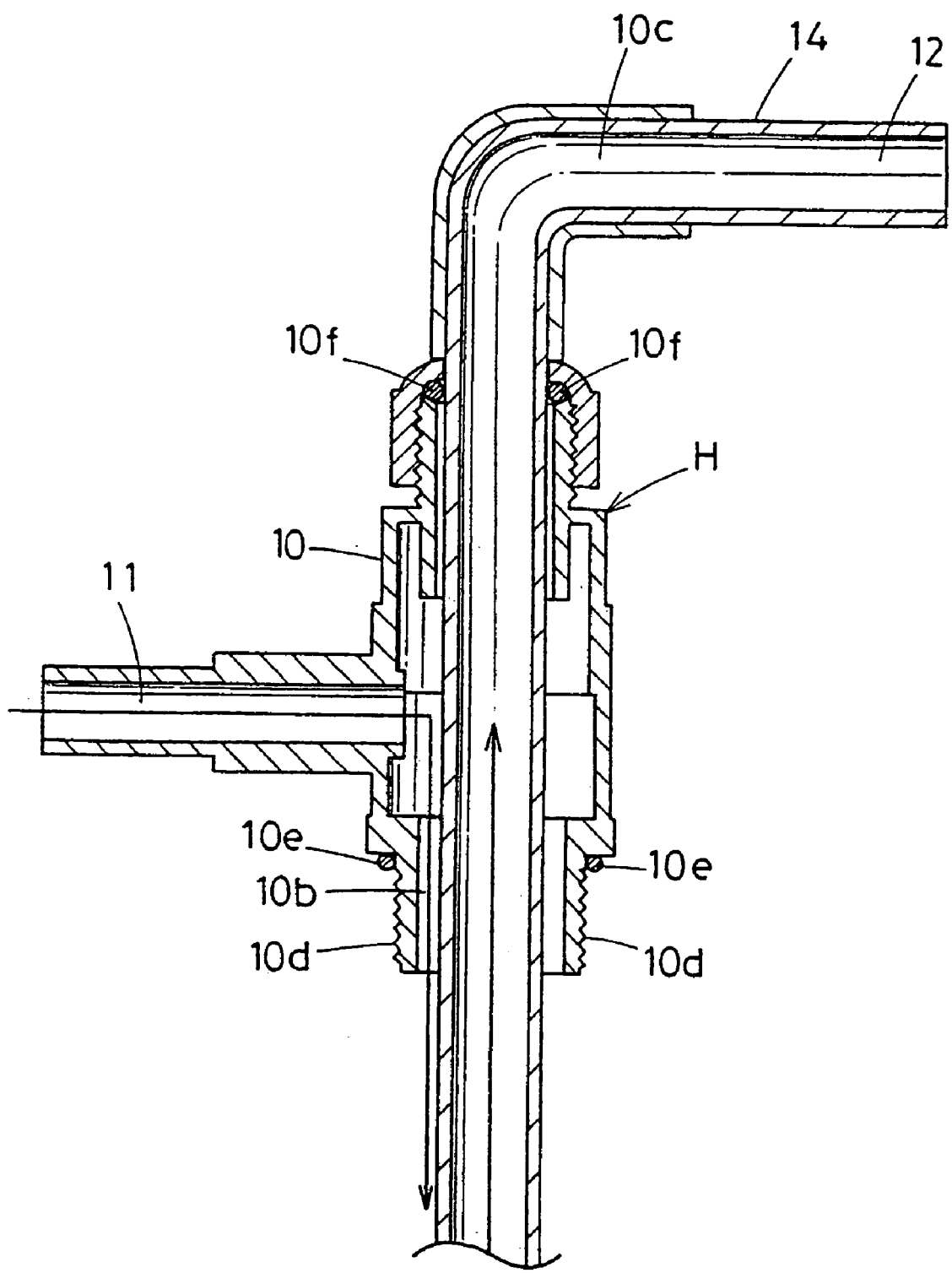
FIG. 8 is a cross sectional view of another embodiment of the fluid filling device of the present invention.

Further, the fluid filling device of the present invention can be structured as shown in FIG. 8.

According to the fluid filling device H of the present embodiment, a tube-like member bent nearly orthogonally (i.e., at a right angle) is inserted in such a manner as to be vertically movable into the tubular body 10 having the fluid inlet 11 projecting from its outer wall so as to form the fluid inlet part 10b and the fluid outlet part 10c inside the tubular body 10. As shown in FIG. 8, the tubular member 14 extends entirely through the tubular body 10. The tube-like (tubular) member 14 is designed to be smaller in diameter than the tubular body 10 so that a predetermined space (a gap) is formed between the outer surface of the tube-like member 14 and the inner surface of the tubular body 10 when the tube-like member 14 is placed in the hollow internal space of the tubular body 10. Consequently, the predetermined space (gap) becomes the fluid inlet part 10b (i.e., a fluid inlet passageway) into which to lead the fluid to the drum, and the internal space of the tube-like member 14 becomes the fluid outlet part 10c (i.e., fluid outlet passageway) through which to lead the fluid from the drum.

As in the aforementioned embodiment, this can bring about the effect of filling the fluid into the containers sequentially without difficulty and eliminate the fear of spilling the fluid from the containers only by installing this fluid filling device in the fluid filler port of the container. In addition, this eliminates the fear of staining the operator's clothing.

In addition, moving the tube-like member 14 in the vertical direction to regulate its height in the container has the effect of being able to regulate the amount of the fluid to be filled into the container.

In addition, the packing 10f is provided in the portion where the tubular body 10 and the tube-like member 14 contact each other so that the connection between the tubular body 10 and the tube-like member 14 can be kept airtight while the tube-like member 14 is moved in the vertical direction.

Figure 9:
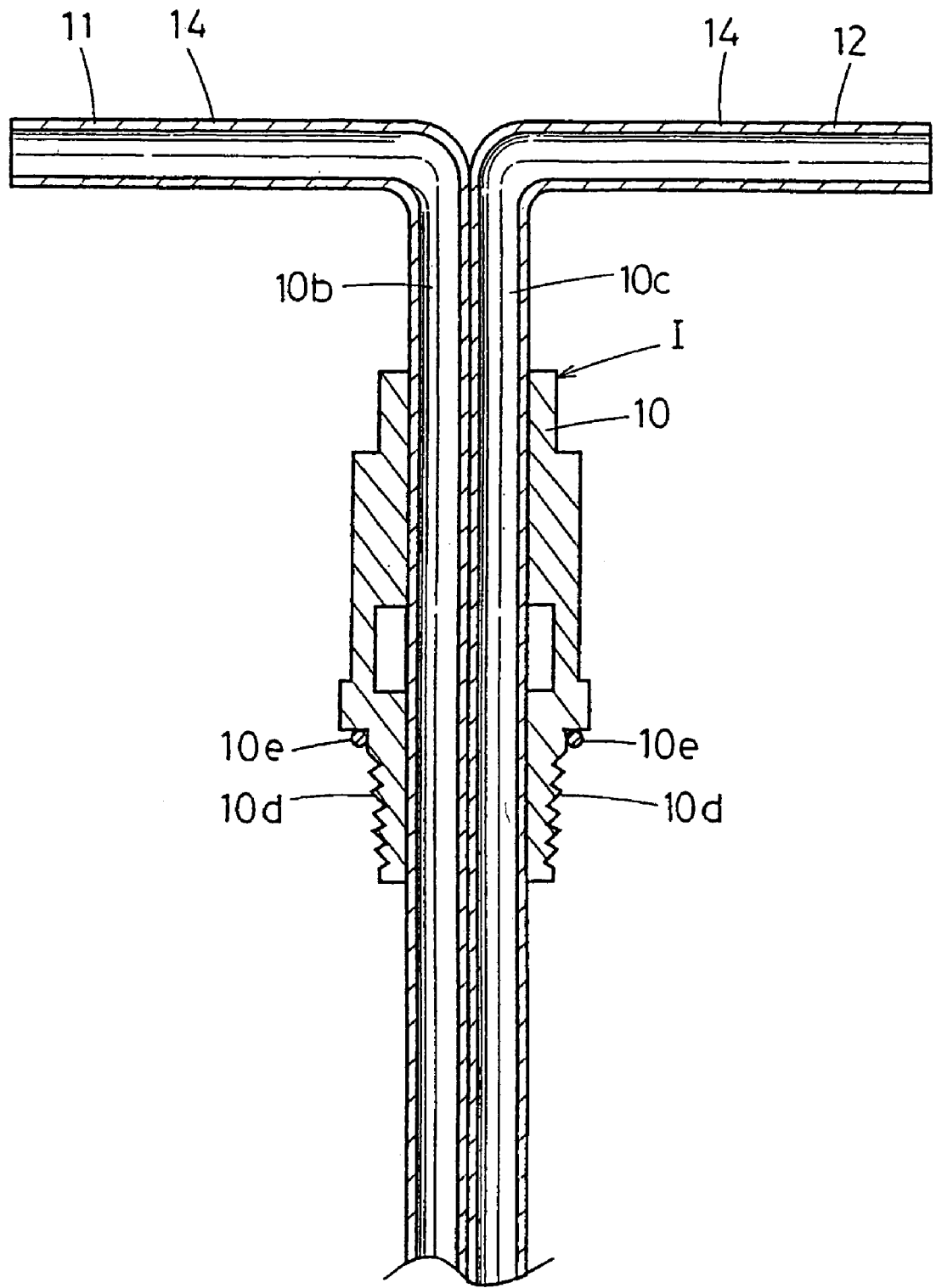
FIG. 9 is a cross sectional view of another embodiment of the fluid filling device of the present invention.

It is also possible to structure the fluid filling device of the present invention as shown in FIG. 9.

According to the fluid filling device I of the present embodiment, the two tube-like members 14 shown in FIG. 8 are inserted into the internal space of the tubular body 10 to form the fluid inlet passageway and the fluid outlet passageway.

This case has the same effect as the above embodiment of filling the fluid into the containers sequentially without difficulty or the fear of spilling the fluid from the containers only by installing this fluid filling device in the fluid filler port of the container. In addition, this eliminates the fear of staining the operator's clothing.

In the fluid filling devices shown in FIG. 6, FIG. 7, FIG. 8, and FIG. 9, it is possible to make the fluid inlet part 10b and the fluid outlet part 10c a fluid outlet part 10b and a fluid inlet part 10c, respectively (i.e., to swap the connections).

Figure 10A:
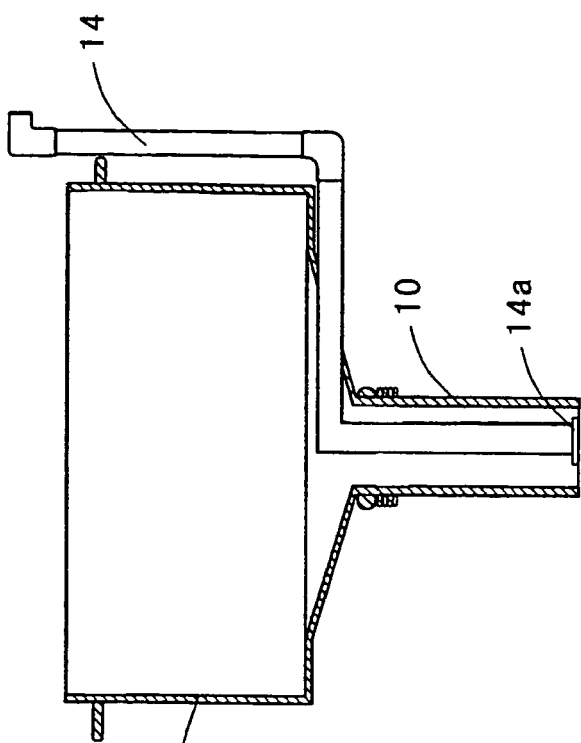
FIGS. 10(a) and 10(b) are cross sectional views of another embodiment of the fluid filling device of the present invention.
Figure 10B:
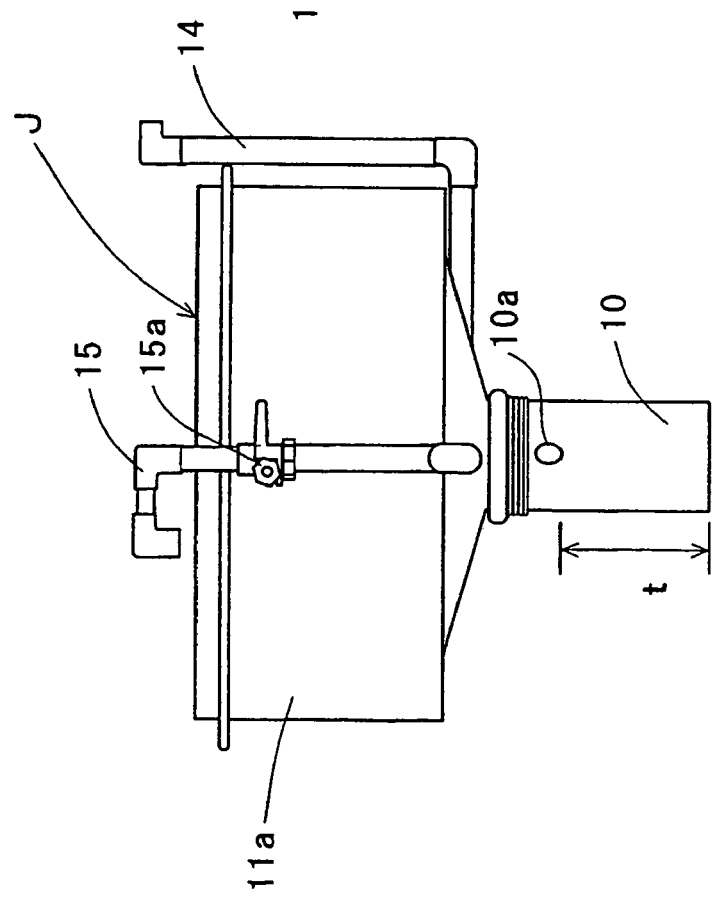

It is also possible to structure the fluid filling device of the present invention as shown in FIG. 10(a) and FIG. 10(b).

As shown in FIG. 10(a) the fluid filling device J of the present embodiment is provided with the funnel member 11a and the tubular body 10 monolithically integrated with each other, wherein the tube-like member 14 is used for air purging, and the tube-like member 15 is used for fluid discharging.

The tube-like member 14 is bent around the middle to be shaped like a cramp. As shown in FIG. 10(b), the bent bottom of the tube-like member 14 is inserted into the tubular body 10, and its upper portion is set along the funnel member 11a. At the bottom end of the tube-like member 14 is provided the brim member 14a shaped like a brim.

The tube-like member 15 is equipped in its middle with an open/close valve for opening and closing the internal space of the tube-like member 15, and its bottom part communicates with the hole 10a formed on the external wall of the tubular body 10.

The hole 10a is formed at a position corresponding to the height "t" from the bottom end of the tubular body 10.

Figure 11:
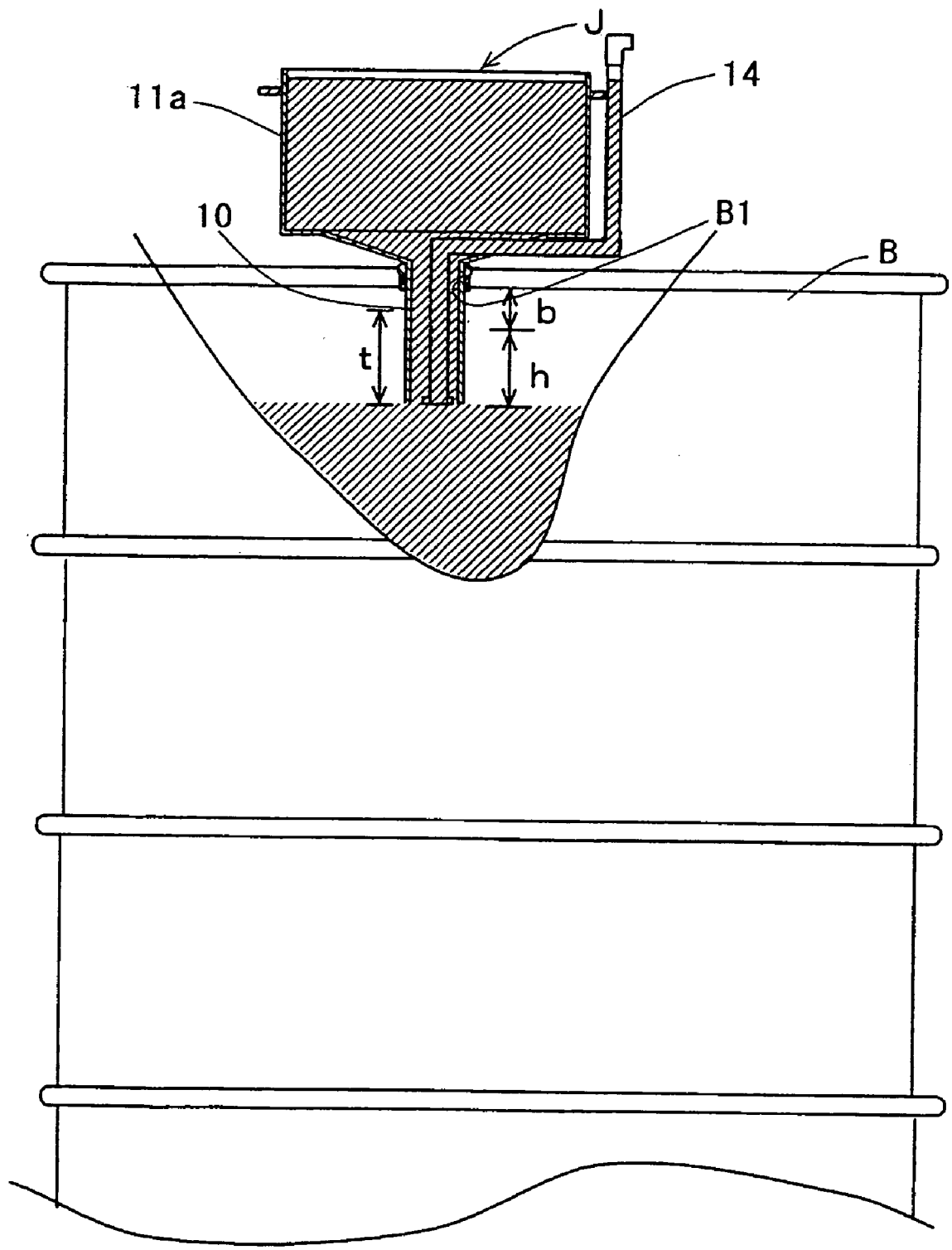
FIG. 11 is a view of the fluid filling device of the present invention in use.

The fluid filling device J thus structured is installed in the fluid filler port B1 of the drum B as shown in FIG. 11, and the waste oil is poured through the funnel member 11a.

Consequently, at the same time as the waste oil is led into the drum B, the air in the drum B is led outside from the tube-like member 14 of the fluid filling device J. As shown in the same drawing, the waste oil can be led into the drum B until the liquid level of the waste oil in the drum B reaches the bottom end of the tubular body 10 of the fluid filling device J.

In this case, the brim member 14a provided at the bottom end of the tube-like member 14 prevents the waste oil led into the funnel member 11a from running backward inside the tube-like member 14 at the air purging inside the tubular body 10.

When the liquid level of the waste oil filled into the drum B reaches the bottom end of the tubular body 10 of the fluid filling device J, no more waste oil can be filled into the drum B, keeping some waste oil inside the funnel member 11a.

Here, assume that the predetermined height position from the liquid level in the drum B is "h," the height position "h" indicates the maximum capacity of the drum B. More specifically, the waste oil can be filed into the drum B until the liquid level of the waste oil reaches this height position. When the fluid is filled up to this height position "h," a clearance with the height "b" is formed between the liquid level and the ceiling of the drum B.

The height position "h" is lower than the height position "t" of the hole 10a formed in the tubular body 10.

The height "b" formed between the liquid level and the ceiling of the drum B is determined by considering the expansion rate of the waste oil. The existence of this clearance when the drum B is filled to maximum capacity allows the safe filling of the fluid into the drum B.

In addition, the hole 10a of the tubular body 10 of the fluid filling device J is formed at the position "t" higher than the liquid level at the time when the drum B is filled with fluid, which prevents the fluid from running into the hole 10a of the tubular body 10 in the state of the drum B being filled to maximum capacity with the fluid.

The fluid filling device J thus structured makes the hole 10a formed on the tubular body 10 and the open/close valve 15 communicate with each other by opening the open/close valve 15, thereby funneling the waste oil remaining in the funnel member 11a into the clearance "h" in the drum B.

More specifically, the sizes of the funnel member 11a and the tubular body 10 are determined so that the amount of waste oil filled into the fluid filling device J can be nearly the same as the capacity of the clearance "h" formed in the drum B. Opening the open/close valve 15 can make the outside of the fluid filling device J and the hole 10a formed on the tubular body 10 communicate with each other so as to lead the air inside the open/close valve 15 to the outside, thereby funneling the waste oil inside the funnel member 11a into the drum B.

As a result, the waste oil remaining in the fluid filling device J can be filled into the drum B, eliminating the problem that the waste oil remains in the fluid filling device J when the drum B is filled to capacity which causes difficulty in disposal of it.

Figure 12:
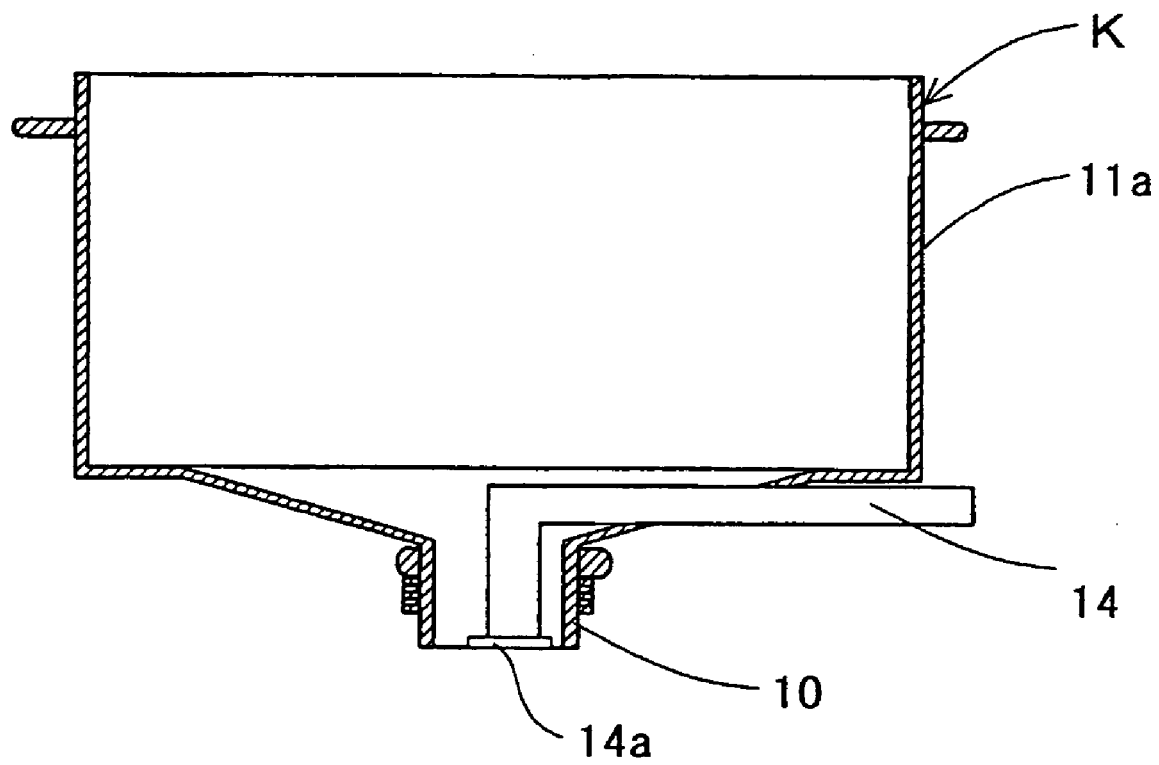
FIG. 12 is a cross sectional view of another embodiment of the fluid filling device of the present invention.

It is also possible to structure the fluid filling device of the present invention as shown in FIG. 12.

In this case, the funnel member 11a and the tubular body 10 are monolithically integrated with each other, and the tube-like member 14 shaped nearly like the letter L is inserted into the tubular body 10.

The fluid filling device K thus structured, similar to the aforementioned fluid filling device J, has the effect of being able to lead the air inside the drum B to the outside via the tube-like member 14 and also to lead the waste oil filled in the drum B to the outside.

Figure 13:
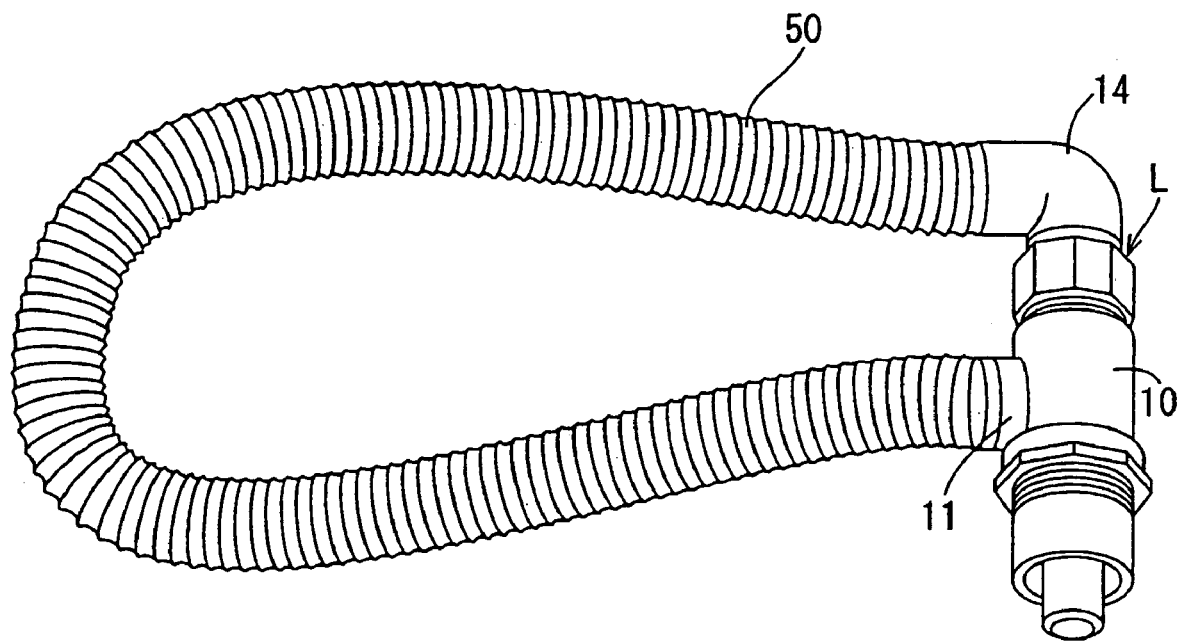
FIG. 13 is an external appearance of the embodiment of the fluid filling device of the present invention.

It is also possible to structure the fluid filling device of the present invention as shown in FIG. 13.

The fluid filling device L shown in the drawing has the same basic structure as the fluid filling device H shown in FIG. 8. The same components are referred to with the same reference symbols, and their explanation is omitted in order to focus on the feature of the fluid filling device L of the present embodiment.

In the fluid filling device L of the present embodiment, similar to the fluid filling device H, the tube-like member 14 bent nearly orthogonally (i.e., at a right angle) is inserted in such a manner as to be vertically movable into the tubular body 10 having the fluid inlet 11 projecting from its outer wall.

In the fluid filling device L, the tube-like member 14 is long enough to be easily detachable from the tubular body 10, and is longer than the tubular member 10. When not being used, the fluid outlet 12 or the opening of the top end part of the tube-like member 14 and the fluid inlet 11 formed on the external wall of the tubular body 10 communicate with each other via the hose 50.

The following is a description of the application of the fluid filling device L thus structured.

In the following description, three fluid filling devices L are prepared as L1, L2, and L3, which are used to fill waste oil into drums.

First, as shown in FIG. 13, the fluid filling device L1 can be stored in the state of the tube-like member 14 being inserted into the tubular body 10 and the fluid inlet 11 of the device L1 itself communicating via the hose 50 with the tube-like member 14 which is the fluid outlet.

Figure 14:
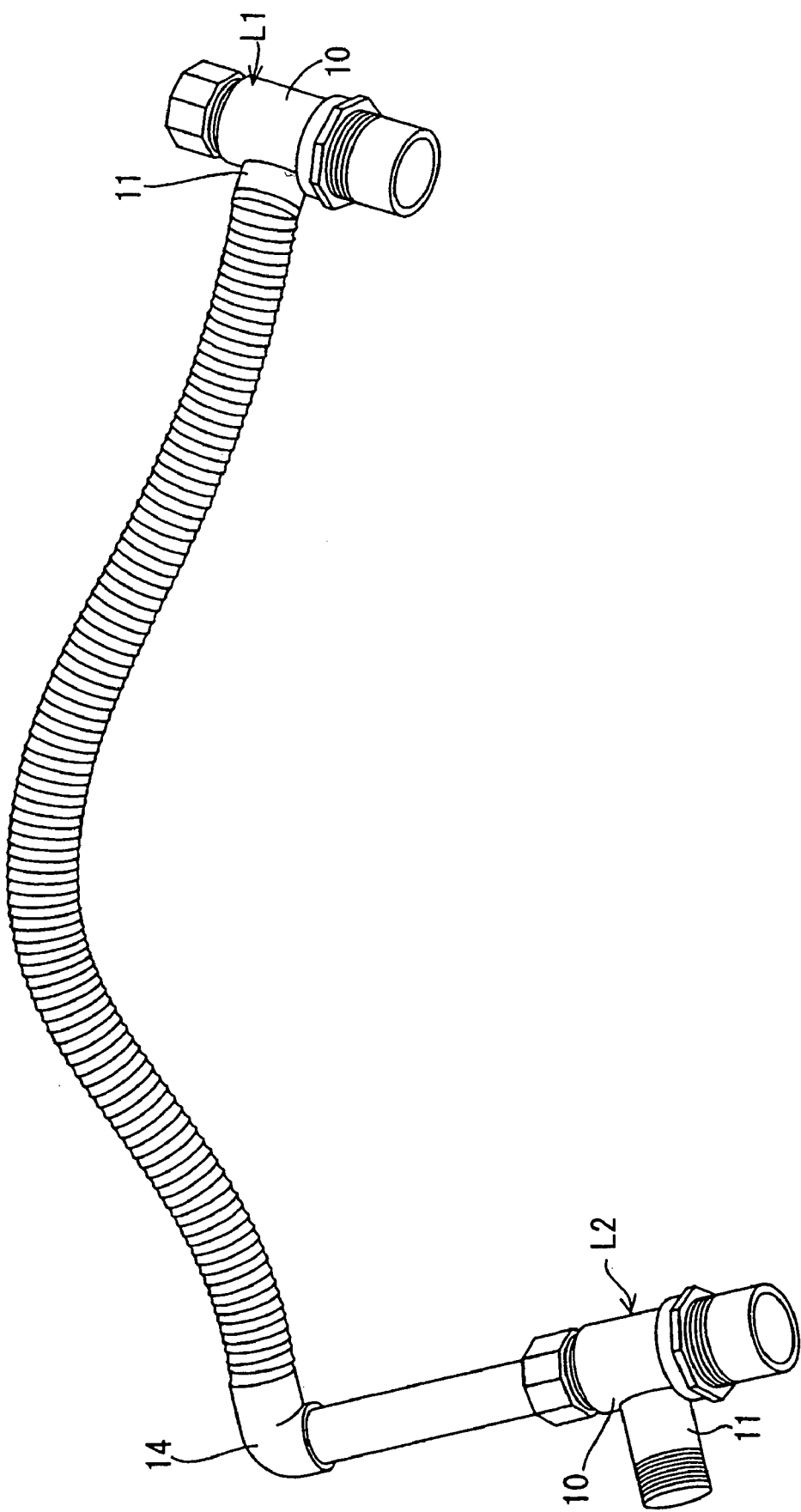
FIG. 14 is a view of the fluid filling device of the present invention in use.

When the fluid filling device L1 is in use, as shown in FIG. 14 the tube-like member 14 inserted into the tubular body 10 of the fluid filling device L1 is pulled out of the tubular body 10 and also out of the tubular body 10 of the fluid filling device L2. The tube-like member 14 of the fluid filling device L1 is at this time inserted into the tubular body 10 of the fluid filling device L2.

Figure 15:
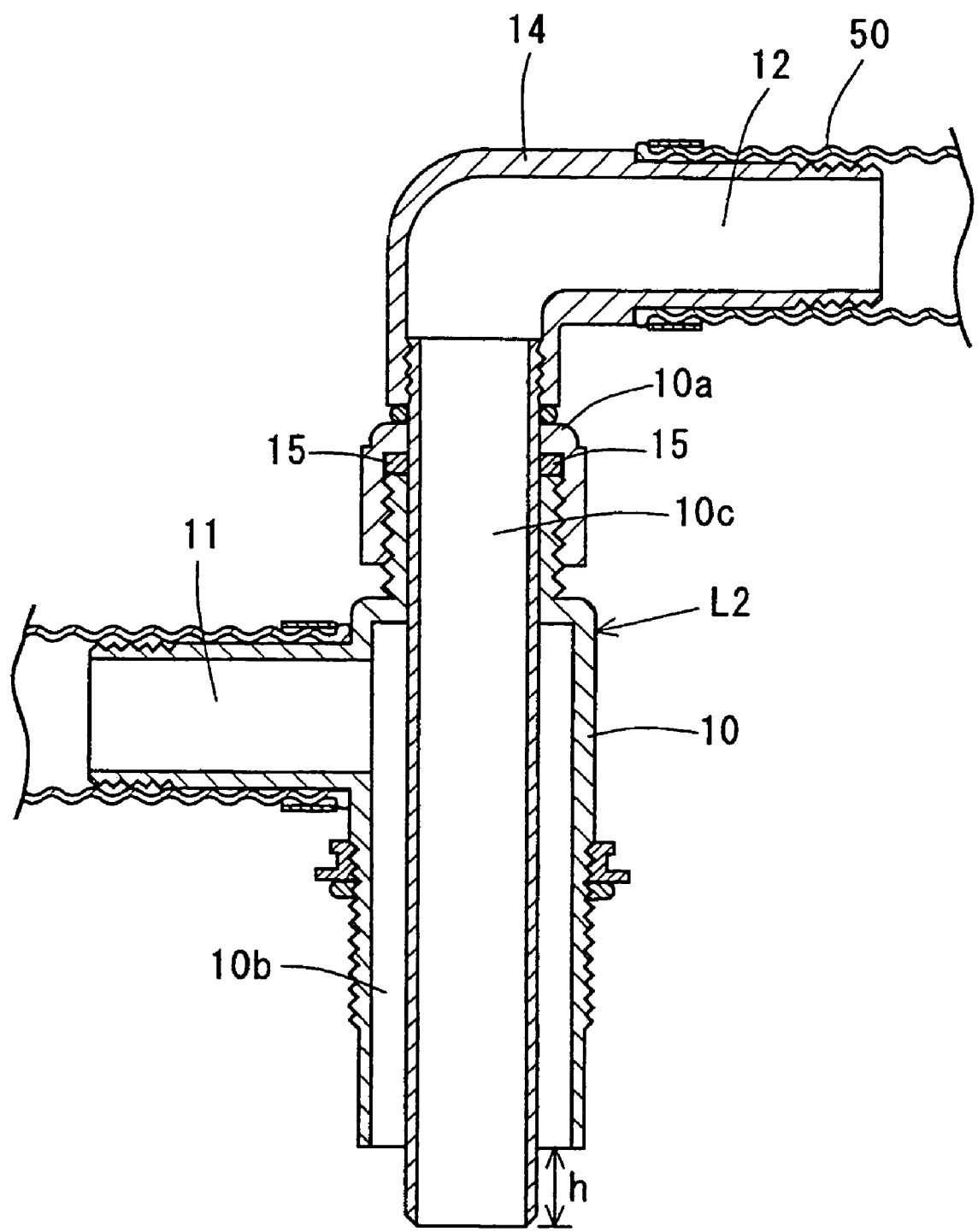
FIG. 15 is a cross sectional view of the fluid filling device of the present invention in use.

In this case, as shown in FIG. 15, the tube-like member 14 of the fluid filling device L1 is inserted into the tubular body 10 of the fluid filling device L2 to form the fluid inlet part 10b and the fluid outlet part 10c in the tubular body 10.

More specifically, the tube-like member 14 is designed to be smaller in diameter than the tubular body 10, and a predetermined space is formed between the tube-like member 14 and the tubular body 10 when the tube-like member 14 is placed in the hollow internal space of the tubular body 10. The predetermined space becomes the fluid inlet part 10b into which to lead the fluid, and the internal space of the tube-like member 14 becomes the fluid outlet part 10c from which to lead the fluid.

Moreover, when the tube-like member 14 is in the state of being inserted, the packing 10F is provided in the portion where the tubular body 10 and the tube-like member 14 contact each other in order to keep the connection between the tubular body 10 and the tube-like member 14 airtight. The screw 15 of the tubular body 10 is screwed so that the packing 10F can elastically deform and come into tight contact with the wall surface of the tube-like member 14, thereby keeping the tube-like member 14 and the tubular body 10 airtight.

Moreover, as described hereinbefore, the tube-like member 14 of the same fluid filling device is commonly used, so the tube-like member 14 of the fluid filling device L1 can be inserted into the tubular body 10 of the fluid filling device L2.

When the tube-like member 14 is in the state of being inserted into the tubular body 10, the bottom end of the tube-like member 14 projects from the tubular body 10 by the length "h."

In the same manner, the tube-like member 14 inserted into the tubular body 10 of the fluid filling device L3 is pulled out of the tubular body 10, and the tube-like member 14 of the fluid filling device L2 is inserted into the tubular body 10 of the fluid filling device L3 to allow communication between the fluid filling devices L2 and L3.

Unlike in the fluid filling devices L1 and L2, in the fluid filling device L3, one end of the hose 51 communicates with the fluid outlet 12 of the tube-like member 14, whereas the other end of the hose 51 does not communicate with the fluid outlet 11 of the tubular body 10 and can be used independent of the tubular body 10.

In other words, the tube-like member 14 of the fluid filling device L3 can be pulled out of the tubular body 10, and the cap provided at the tip end part of the hose 51 can be inserted into the fluid filler port of the drum.

Figure 16:
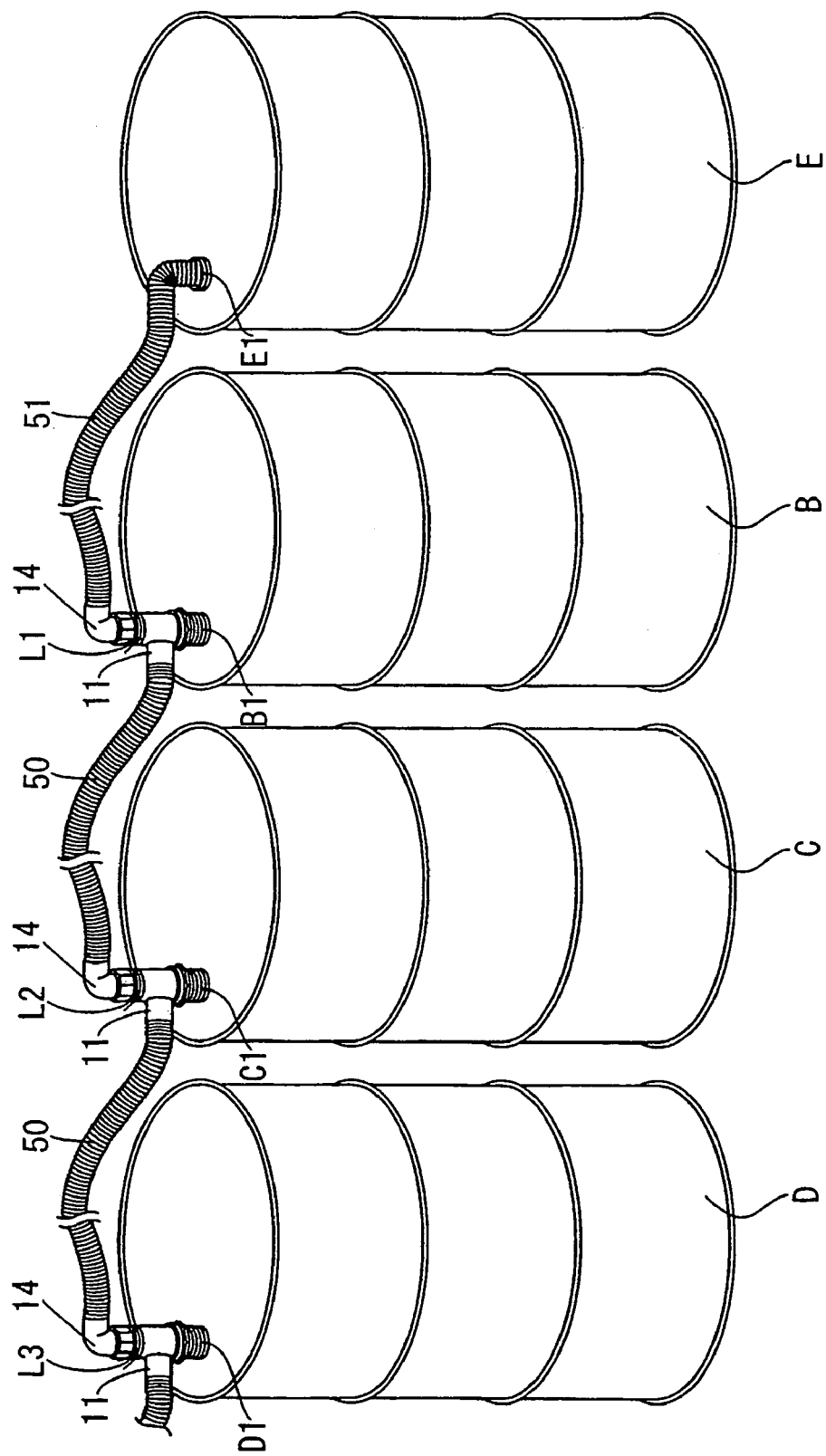
FIG. 16 is a view of the fluid filling device of the present invention in use.

Consequently, as shown in FIG. 16, the fluid filling devices L1, L2, and L3 installed, respectively, in the fluid filler ports B1, C1, and D1 of the drums B, C, and D communicate with each other via the hose 50. The tube-like member 14 of the fluid filling device L3 pulled out at the time of the connection with the fluid filling device L2 is inserted into the tubular body 10 of the fluid filling device L1, and the cap of the hose 51 of the tube-like member 14 is inserted into the fluid filler port E1 of the drum E.

In addition, the fluid inlet 11 of the fluid filling device L3 installed in the drum D is connected to one end of the hose 50 linked with the waste oil suction pump (not illustrated), and the waste oil discharged by this pump flows into the drum D via the fluid inlet 11 of the fluid filling device L3. When the drum D is filled to capacity, the waste oil is led into the next drum C via the hose 50 from the fluid outlet 12 of the tube-like member 14. In the same manner, when the drum C is filled to capacity with the waste oil, the waste oil flows this time into the drum B.

As a result, the drum B, C, and D are filled with the waste oil in this order and the drum E is finally filled with the waste oil.

According to the fluid filling devices L1, L2, and L3, the following effects can be obtained.

The fluid filling device L, when not in use, can be stored in the state of the tube-like member 14 being inserted into the tubular body 10 as shown in FIG. 13, which has the effect of making the fluid filling device L more compact when the hose 50 is in the state of being connected with the fluid outlet 12 of the tube-like member 14.

In addition, when the fluid filling device L is in use, as shown in FIG. 14, the tube-like member 14 of the fluid filling device L1 is pulled out of the tubular body 10 and is inserted into the tubular body 10 of the fluid filling device L2. This structure brings about the effect of connecting these fluid filling devices with ease.

Furthermore, as described above, the tube-like member 14 is designed to be longer than the tubular body 10 by the length "h," so after the waste oil is filled into the drums, the waste oil remaining inside the hose 50 can be filled into the clearance formed in the drum because of the difference in the length "h." This prevents the spilling of the waste oil inside the hose when the fluid filling devices are removed from the drums.

Furthermore, the fluid filling device J of the aforementioned embodiment can be designed so that the bottom end of the tube-like member 14 can reach the bottom part of the drum when the fluid filling device J is in the state of being installed in the fluid filler port of a drum.

In this case, the bottom end of the tube-like member 14 has a pointed shape.

As a result, the hose of a compressor to feed air from outside is connected with the fluid inlet 11 of the fluid filling device J, and air is fed into the drum from outside by this compressor.

As a result, when the drum is filled with fluid such as waste oil, this fluid can be pushed in through the pointed tip end part of the tube-like member 14 with the pressure of the air fed through the fluid inlet 11, thereby being pushed out via the fluid outlet part 10c of the tube-like member 14.

In addition, as described above, with the fluid filling device in which the bottom end of the tube-like member 14 is designed to be long enough to reach the bottom part of the drum, and the bottom end has a pointed shape, the fluid inside the drum can be suctioned from the bottom end of the tube-like member 14 by the pump connected to the fluid filling device via the hose.

It is also possible in this case to prepare several fluid filling devices having a pointed bottom end. As shown in FIG. 16, these devices are connected to each other via the hose 50, and the tip end of the hose 51 is connected to a pump so as to suction the fluid filled into the drums B, C and D from the drums D, C, and B in this order.

INDUSTRIAL APPLICABILITY

According to the present invention, when the fluid filling device is in the state of being installed in the fluid filler port of a container, fluid outside the container is led into the container via the fluid inlet part, and when the fluid is in the state of being filled in the container, the fluid inside the container is led to the outside of the container via the fluid outlet part. Further, when the fluid is led into the container from outside via the fluid inlet path until the container is filled with fluid, the fluid can be led to the outside of the container via the fluid outlet path. In this case, the invention has the effect of filling the fluid into the container without difficulty and eliminating the fear of spilling the fluid from the container only by installing the fluid filling device in the fluid filler port of the container. This can also eliminate the fear of staining the operator's clothing.

Furthermore, a fluid inlet path is formed of the communication part communicating with the internal space of the container, the fluid inlet part formed in the internal space of the tubular body in communication with the communication part, and the fluid inlet communicating with the fluid inlet part. On the other hand, a fluid outlet path is formed of the communication part communicating with the internal space of the container, the fluid outlet part formed in the internal space of the tubular body in communication with the communication part, and the fluid outlet communicating with the fluid outlet part. Further, when the fluid is led into the container from outside via the fluid inlet path until the container is filled with fluid, the fluid can be led to the outside of the container via the fluid outlet path. In this case, the invention has the effect of filling the fluid into the container without difficulty and eliminating the fear of spilling the fluid from the container only by installing the fluid filling device in the fluid filler port of the container. This can also eliminate the fear of staining the operator's clothing.

Furthermore, a fluid inlet path is formed of the communication part communicating with the internal space of the container, the fluid inlet part formed in the internal space of the tubular body in communication with the communication part, and the funnel-shaped fluid inlet communicating with the fluid inlet part. As a result, when the fluid is led into the container from outside via the fluid inlet path until the container is filled with fluid, the fluid can be led to the outside of the container via the fluid outlet path. In this case, the invention has the effect of filling the fluid into the container without difficulty and eliminating the fear of spilling the fluid from the container only by installing the fluid filling device in the fluid filler port of the container. This can also eliminate the fear of staining the operator's clothing.

Shaping the fluid inlet like a funnel brings about the effect of easily and swiftly leading the waste oil into the container.

The invention claimed is:

1. A fluid filling device to be detachably installed in a fluid filler port of a container, said fluid filling device comprising:
   a tubular body having a wall and a fluid inlet passageway with a fluid inlet projecting from an external surface of said wall;
   a tubular member inserted into said tubular body so as to be movable through said tubular body in the vertical direction, an interior of said tubular member comprising a fluid outlet passageway with a fluid outlet, said tubular member and said tubular body being arranged such that each of said fluid outlet passageway and said fluid inlet passageway has an open end to open into an interior of the container and such that said fluid outlet passageway is separate from said fluid inlet passageway; and
   a packing between an upper part of said tubular body and said tubular member to maintain an airtight connection between said tubular body and said tubular member.

2. The fluid filling device of claim 1, further comprising a hose detachably connecting said fluid outlet of said tubular member to said fluid inlet of said tubular body.

3. The fluid filling device of claim 1, wherein said tubular member is longer than said tubular body and extends entirely through said tubular body so as to project from a bottom end of said tubular body by a predetermined length.

4. The fluid filling device of claim 1, wherein said tubular member projects from a bottom end of said tubular body so as to extend to an inner bottom of the container on which the tubular body is to be installed, said fluid inlet being connected via a hose to a compressor for feeding air through said fluid inlet into the container so as to cause fluid in the container to flow outside of the container via said tubular member.

5. The fluid filling device of claim 1, wherein said tubular member projects from a bottom end of said tubular body so as to extend to an inner bottom of the container on which the tubular body is to be installed, said fluid outlet of said tubular member being connected via a hose to a pump for sucking fluid in the container outside of the container via said tubular member.

6. The fluid filling device of claim 1, wherein said fluid inlet passageway is separate from said fluid outlet passageway such that said fluid inlet passageway and said fluid outlet passageway communicate with each other only via an interior of the container on which said fluid filling device is to be installed.

7. The fluid filling device of claim 1, wherein said fluid inlet allows communication between an exterior of said tubular body and an interior of said tubular body; and
   said tubular member and said tubular body are arranged to define a gap in said interior of said tubular body between an inner surface of said wall of said tubular body and an outer surface of a wall of said tubular member such that said fluid inlet passageway comprises said gap.

8. The fluid filling device of claim 7, wherein said fluid inlet passageway is separate from said fluid outlet passageway such that said fluid inlet passageway and said fluid outlet passageway communicate with each other only via an interior of the container on which said fluid filling device is to be installed.

9. The fluid filling device of claim 1, wherein said tubular member comprises a first tubular member, said fluid inlet passageway with said fluid inlet comprising a second tubular member being inserted into said tubular body so as to extend entirely through said tubular body.

10. The fluid filling device of claim 9, wherein said fluid inlet passageway is separate from said fluid outlet passageway such that said fluid inlet passageway and said fluid outlet passageway communicate with each other only via an interior of the container on which said fluid filling device is to be installed.

* * * * *